Oct. 24, 1967
G. L. RICHARDS
3,349,190
TRANSMISSION OF SUPERVISORY SIGNALS IN A TIME DIVISION MULTIPLEX SYSTEM
Original Filed March 26, 1963
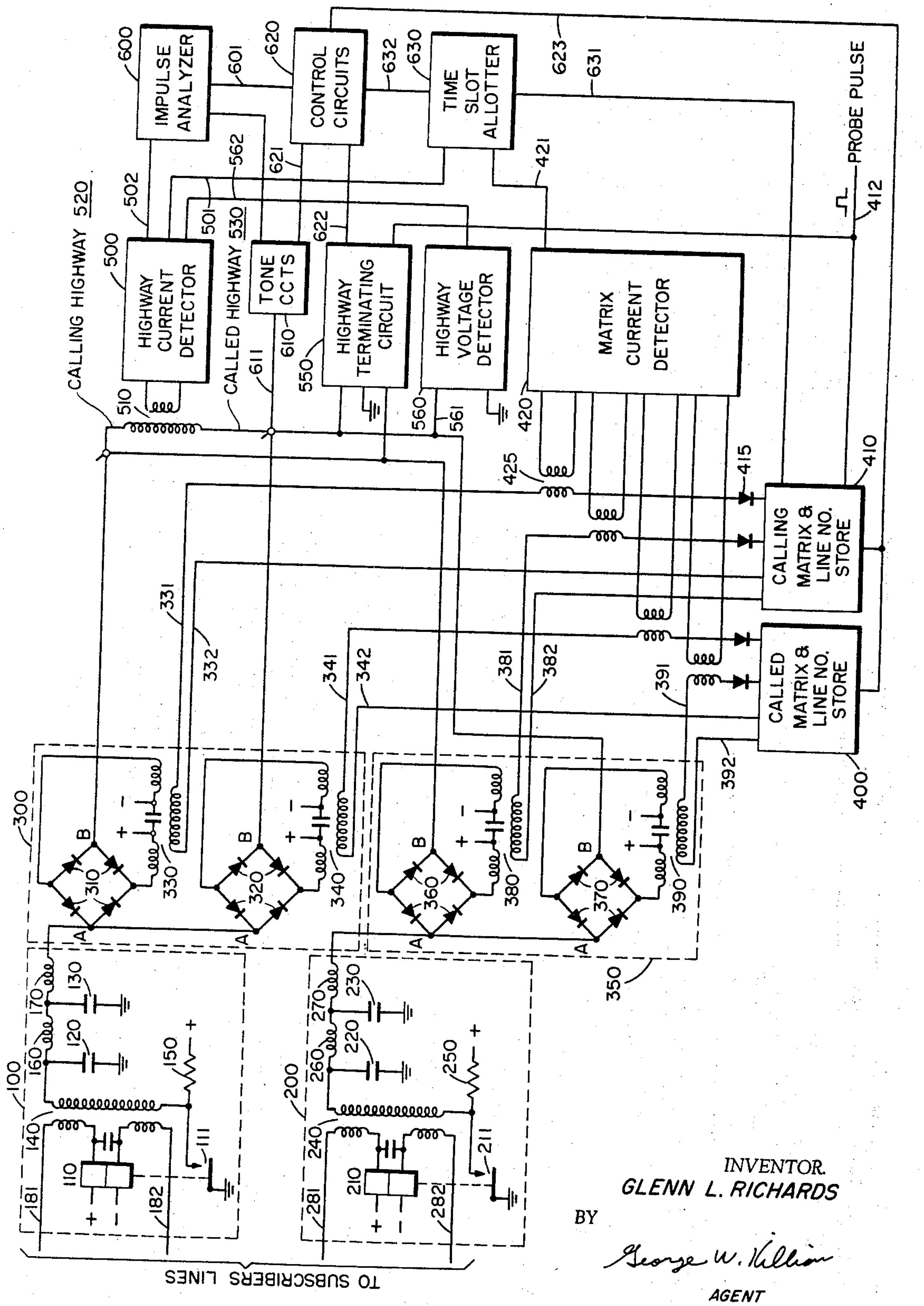
INVENTOR.
GLENN L. RICHARDS
BY *George W. Killian*
AGENT United States Patent Office 3,349,190
Patented Oct. 24, 1967

3,349,190
TRANSMISSION OF SUPERVISORY SIGNALS IN A TIME DIVISION MULTIPLEX SYSTEM

Glenn L. Richards, Webster, N.Y., assignor, by mesne assignments, to Stromberg-Carlson Corporation, Rochester, N.Y., a corporation of Delaware Continuation of application Ser. No. 268,011, Mar. 26, 1963. This application Dec. 19, 1966, Ser. No. 603,047
13 Claims. (Cl. 179—18)

ABSTRACT OF THE DISCLOSURE

An automatic communication system including a plurality of communication circuits selectively connectable to respective ends of a common communication channel in a selected time slot of a repetitive time frame by a plurality of individual gating means, scanning means for actuating in a prescribed sequence the gating means not associated with a communication connection, wherein requests for service determined by a current detector coupled to the common communication channel which is terminated in a matched impedance periodically with actuation of said scanning means, requests for service being detected by absence of a supervisory current signal in the channel in coincidence with application of a scanning signal to a selected gating means.

This application is a continuation of Ser. No. 268,011, filed Mar. 26, 1963 and now abandoned.

This invention relates in general to automatic communication systems and, more particularly, to the transmission of supervisory signals in an automatic communication system of the time division multiplex type.

Although the invention herein disclosed is suitable for more general application, it is particularly adapted for use in communication systems having a plurality of communication circuits, any one of which may be selectively connected to any other in response to the transmission of appropriate coded signals. A telephone system would be typical of such a system and in a telephone system the cited coded signals would emanate from the calling one of the communication circuits and would be indicative of the desired one of the communication circuits. In addition, coded signals indicative of a request for service, answer, or disconnect, may be transmitted from any one of the stations. In telephone systems it is customary to designate all such signals as supervisory signals and, therefore, the coded signals transmitted from any of the communication stations described herein will be referred to henceforth as supervisory signals.

In the prior art communication systems of the time division multiplex type, it was customary to provide a common communication channel to transmit the voice or other communicating signals and to provide a separate data channel for transmitting supervisory signals from the signaling circuit to the common control circuits. The patent application of W. F. Bartlett et al., Ser. No. 27,888, filed May 9, 1960, now Patent No. 3,066,192, and assigned to the same assignee as the present application, discloses a time division multiplex switching system employing separate transmission and signaling channels; and the patent application of Barrie Brightman, Ser. No. 45,342, filed July 26, 1960, now Patent No. 3,134,859 and also assigned to the same assignee as the present application, discloses another time division multiplex automatic communication system incorporating separate transmission and data highways.

It is the general object of this invention to provide a new and improved automatic communication system.

It is a more specific object of this invention to provide a new and improved automatic communication system of the time division multiplex type wherein a common communication channel is employed to transmit both communication and supervisory signals.

In the illustrated embodiment of the present invention, there are employed several circuits whose details and functions are well known to those skilled in the art to which this invention pertains, and since the cited applications illustrate and describe the operation of these typical circuits, the details thereof will not be described herein. In addition, there are provided a few circuits having functions not included in the cited time division multiplex communication systems. The principal new circuit is the highway current detector which is employed to detect the presence of supervisory signals on the highway and to transmit appropriate signals to other circuits as required. A similar circuit is the matrix current detector which is employed to detect the presence of multiplexing signals to the line circuit gates and to provide appropriate signals to other circuits as required. The functioning of these and other circuits will be described more fully in the detailed description.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which illustrates the concept of the invention in block diagram form.

It is to be understood that only the details which are necessary to understand the inventive concept described herein have been shown. For example, it is believed that the inclusion of the circuit details of the various components which are functionally designated would only tend to mask or obscure the inventive concept described herein. That is, the circuit details have not been shown since they form no part of the present invention and since various combinations of circuit elements are readily available and well known to those skilled in the art who may wish to practice this invention.

DETAILED DESCRIPTION

It is believed that the concept and operation of one embodiment of the invention can best be understood by considering the drawing together with the following detailed description.

In accordance with commonly accepted practice, the circuit terminals that are connected to ground potential are indicated by a series of successively shorter and parallel lines contained within an imaginary triangle. In a similar manner, circuit terminals which are connected to potentials which are positive or negative with respect to ground are designated (+) or (—), respectively.

Two line circuits, 100 and 200, are illustrated which are connected by the pairs of lines 181 and 182, and 281 and 282, to their respective telephone instruments (not shown), which may include the same type of supervisory signaling circuit which is customarily employed in a typical telephone subset. That is, the instruments to be associated with the type of line circuit illustrated provide an open and closed direct current circuit when on- and off-hook, respectively. In addition, the telephones are equipped with dials which include a pair of normally closed contacts in the cited direct current circuit when the telephone is off-hook and which are opened briefly a number of times corresponding to the digit dialed, when a digit is dialed. For convenience, corresponding parts in the line circuits 100 and 200 have been assigned similar identifying numerals, except for the first digit, which is used to distinguish between the two line circuits illustrated.

When the telephone associated with line circuit 100 is lifted for the purpose of originating a communication connection to another telephone, a D.C. current will be completed from the positive potential connected to one terminal of the upper winding of relay 110, through the upper inductive winding thereof, the upper left winding of transformer 140 to line 181, over the line to the telephone, through the dial and hookswitch contacts back to line 182, the lower left winding of transformer 140 and the lower inductive winding of relay 110 to the negative potential connected thereto. The flow of D.C. current through this circuit will operate relay 110 and cause contacts 111 of relay 110 to close and, when dialing is commenced, contacts 111 will open in substantial synchronism with the mentioned dial contacts. That is, contacts 111 will be closed when there is a direct current connection through the telephone from line 181 to line 182 and contacts 111 will be open when the direct current connection through the telephone from line 181 to line 182 is open. Or, in telephone parlance, contacts 111 will repeat the on- or off-hook supervision of the associated telephone. In a similar manner, contacts 211 of relay 210 in line circuit 200 will repeat the on- or off-hook supervision of the telephone associated therewith.

When the telephone associated with line circuit 100 is on-hook, that is, when contacts 111 are open, the bias resistor 150 will establish a positive potential at the upper terminal of the resonant capacitor 130 of the filter, comprising capacitors 120 and 130 and inductors 160 and 170. If desired, the magnitude of this positive potential may be used to provide class of service information. Associated with line circuit 100 is a voice and supervisory gate 300 which comprises two similar portions. The upper half may be considered the calling gate, while the lower half is the called gate. A similar gate 350 is associated with line circuit 200. It should be observed that a winding of a transformer in the calling half of each voice gate is connected to the calling matrix and line number store 410, while a winding of a transformer in the called half of each voice gate is connected to the called matrix and line number store 400.

In a manner familiar to those skilled in the time division multiplex art, it is possible to generate a plurality of time slot pulses in a repetitive time frame and to selectively apply one or more of the pulses from one or more of the frames to a desired circuit. The cited patent applications illustrate typical time division multiplex equipment and disclose additional details relating to the generation, application, and utilization of time slot pulses. For the present purposes it should be understood that a time slot pulse, designated as a probe pulse, and in a given time slot of a repetitive time frame, is applied once each time frame over lead 412 to the calling matrix and line number store 410 and to the highway terminating circuit 550. In a manner more fully described in the cited patent applications, the probe pulses are systematically and sequentially applied to each of the matrix cross-points in matrix 410 which are not identified as the cross-points associated with busy lines effectively scanning the line gate to detect requests for services. The line number store portion of the calling matrix in line number store 410 provides the necessary memory of which of the lines are busy. The probe pulse is an interrogating pulse which is applied to each matrix cross-point to ascertain if the line associated therewith is originating a request-for-service signal. More specifically, the application of the time slot probe pulse to conductors 331 and 332, which comprise the two conductors at one cross-point, will cause a pulse to be passed through transformer 330 so that for that time slot a low impedance circuit exists between points A and B of the diode voice gate comprising the four diodes 310. During the same time slot but in a subsequent time frame, the probe pulse may be applied to leads 381 and 382 to turn on the diode voice gate comprising diodes 360. In this manner, the idle line circuits are systematically and sequentially interrogated or scanned to determine if they are originating a request-for-service signal.

If it is assumed that contacts 111 are open when the interrogation is made, it will be seen that when the probe pulse turns on the calling half of the voice gate 300, a positive pulse from capacitor 130 will be passed through inductor 170 through the voice gate from point A to point B to the calling highway 520, through the left-hand winding of transformer 510, the called highway 530, to the highway terminating circuit 550 and ground.

The highway terminating circuit 550 is gated on during the time slot of the probe pulse as may be seen by the connection from lead 412 to the highway terminating circuit 550. The connection of the highway terminating circuit 550 to the highway must be gated on and off in order to prevent the highway terminating circuit from derogating voice signals in other time slots. The highway terminating circuit 550 forms a terminating circuit so that an actual current will flow through the circuit traced above in order that a pulse may be passed through transformer 510 to the highway current detector 500. The highway terminating circuit will normally have an impedance equal to the characteristic impedance of the highway. It should be noted that the current detected by the highway current detector 500 is a pulsed D.C. current. Thus, each time an interrogating or probe pulse is applied to one of the calling matrix cross-points, a pulse of D.C. current will be detected by the highway current detector if the associated line is on-hook, or idle.

When a telephone is taken off-hook, the relay 110 or 210 associated therewith will operate in the manner previously described and, therefore, the contacts 111 or 211 will close. If it is assumed that the telephone associated with line circuit 100 is off-hook, contacts 111 will be closed and a ground potential will be connected to the upper terminal of resonant capacitor 130. Therefore, when a probe pulse is applied over leads 331 and 332 to the upper half of the voice gate 300, no pulse of D.C. current will be passed to the highway and detected by the highway current detector 500. However, the lack of current detection by the current detector 500 is not sufficient proof that a line is instituting a request for service. For example, the removal of the physical line circuit 100 and the voice gate 300 would provide the same apparent result as a request for service so far as the highway current detector 500 is concerned. Accordingly, a matrix current detector 420 is provided which tests for and detects the current in the matrix cross-point wires 331 and 332. Transformer 425 passes the matrix cross-point current to the matrix current detector 420. The diodes 415 are provided to prevent feedback from one matrix point to another.

In summary, when a line is on-hook a, pulse of D.C. current will be detected by both the matrix current detector 420 and the highway current detector 500, and the coincidence of these two signals will indicate that the line being interrogated is not originating a request-for-service signal. But, when a pulse of D.C. current is detected by the matrix current detector 420 and not by the highway current detector 500, it will be an indication that the interrogating line is initiating a request for service; that is, that the interrogated line is off-hook. When the last-named condition prevails, a time slot pulse in the time slot of the probe pulse will be applied to leads 501 and 421 from the highway current detector 500 and the matrix current detector 420, respectively, to the time slot allotter 630. The time slot allotter 630 will respond to the coincident receipt of pulses on lines 501 and 421 by assigning an idle time slot to the line requesting service. The line number store 410 will mark the line busy in response to a signal on lead 631 to inhibit further interrogation of the line and thereafter the calling portion of the voice gate 300 will be pulsed on once each time frame in a time slot assigned to the calling line. The manner of assigning idle time slots to a calling line and of turning on the voice gate in the calling line is more fully described in the cited patent applications.

The time slot allotter 630 also provides a signal over lead 632 to the control circuit 620. The control circuit 620 will pass a time slot pulse in the time slot assigned to the calling line over lead 621 to the tone circuit 610, which passes dial tone over lead 611 to the highway in the assigned time slot. Thus, the tone circuit 610 and the calling line circuit 100 will be gated on in the time slot assigned to the calling party and dial tone will be heard by the calling party.

In response to the receipt of dial tone, the calling subscriber will operate his dial which, it will be recalled, causes contacts 111 to open a number of times corresponding to the digit dialed. During dialing, the upper half of the voice gate 300 is being turned on once each time frame in the assigned time slot. Because a time frame has a period of approximately one hundred microseconds while the dial contacts have an open period of approximately fifty thousand microseconds per pulse, many time slot pulses will be transmitted during each open interval of the contacts 111. The highway current detector 500 will detect the first time slot pulse of the first digit and a signal will be passed over lead 502 to the impulse analyzer 600, which will signal the control circuits 620 which will thereupon stop connecting the dial tone circuit to the highway in the calling time slot. At the same time, the control circuit 620 will start to pass time slot pulses to the highway terminating circuit 550 to provide a termination now that the dial tone circuit has been disconnected. Accordingly, each time the contacts 111 are opened, a series of time slot pulses are passed through the voice gate 300 and the transformer 510 to the highway terminating circuit 550, in the manner previously described. The highway current detector 500 is able to detect the series of time slot pulses and passes them over lead 502 to the impulse analyzer 600. The impulse analyzer 600 analyzes the series of pulses and the time interval separating the series of pulses and thereby recognizes the signals as digits and passes the digital information over lead 601 to control circuits 620. When the complete called number is registered, the control circuit 620 passes the identity of the called line over lead 623 to the called matrix and line number store 400 which then marks the called number as busy and, assuming the called line is the one connected to line circuit 200, applies time slot pulses in the time slot assigned to the calling line to leads 391 and 392 to turn on the bottom half of the gate 350 in the assigned time slot. The foregoing description, of course, assumes that the called line is idle. Had the called line been busy, the called matrix and line number store 400 would have returned a busy signal on lead 623 and the control circuit would have controlled the tone circuit 610 over lead 621 to cause busy tone to be applied to the highway in the assigned time slot. However, if it is assumed that the called line is idle and that low level tone ringing is employed, the operation will proceed as described and the control circuit 620 will cause the tone circuit 610 to apply ringback tone and ringing to the highway in the assigned time slot, but in alternate time frames. During the time that the ringback tone and ringing signals are applied to the highway, the calling voice gate will be gated open only while the ringback tone is applied to the highway and the called voice gate will be gated on only while the ringing signal is applied to the highway. While the ringing and ringback signals are being gated to the hihway, the highway terminating circuit 550 is not required and will not be pulsed on. But during the interval between ringing, i.e., the silent period, the highway terminating circuit 550 will be connected to the highway in the assigned time slot. The control circuits control these functions over leads 621 and 623.

When the called party responds to the ringing of the called telephone by answering, the relay 210 will be operated and contacts 211 will be closed. The closure of contacts 211 will cause capacitor 230 to be shunted and, therefore, supervisory signals will no longer be sent from line circuit 200 via the lower half of the voice gate 350 and through the left half of the transformer 510 of the highway current detector 500 to the highway terminating circuit 550 and ground. The highway current detector 500 senses the cessation of the supervisory signals and passes a signal over lead 502 to the impulse analyzer 600 which, in turn, passes a signal over the lead 601 to the control circuits to stop the application of ringing and ringback tone and to start gating on the upper and lower halves of the voice gates 300 and 350, respectively, in the assigned time slot of each time frame so that two-way voice communication may take place between the calling and called subscribers. In addition, the control circuit 620 passes a pulse over lead 622 to prevent the highway terminating circuit 550 from being connected to the highway during the assigned time slot. It should be recalled that the terminating circuit is not connected to the highway while tones are bing applied as at that time the tone circuits 610 provide the required termination.

During conversation, the contacts 111 and 211 are closed and no supervisory pulses of D.C. current are applied to the line to be detected by the highway current detector 500. The upper half, or calling half, of voice gate 300 and the lower half, or called half, of the voice gate 350 are pulsed on each frame during the time slot assigned the calling line and two-way communication takes places on a time division multiplex basis.

Should either party operate the hookswitch, the D.C. loop to that party's relay will be opened and the contacts 111 or 211, as the case may be, will open. If it is assumed that the calling party operated his hookswitch, then contacts 111 will open and a pulse of D.C. current will be applied to the highway and detected by the highway current detector 500. In this case, the highway terminating circuit 550 is not needed to provide a terminating circuit for the supervisory signal as the called line circuit 200 provides a termination.

It should be noted that the highway current detector 500 includes means for distinguishing between supervisory signals from the called and calling line circuits. If the supervisory signals from the calling line circuit are assumed to cause a current to flow therefrom, it will be seen that such current passes through the left winding of transformer 510 from top to bottom, while a similar current from the called line circuit will cause a current to flow from bottom to top in the winding. Accordingly, polarities of a first and second sense are induced in the right-hand winding of transformer 510 in response to supervisory signals from the calling and called line circuits and, therefore, the highway current detector can determine whether a detected supervisory signal originated from a calling or a called line circuit. It may be seen that the same situation prevails if line circuit 200 is the calling line and line circuit 100 is the called line. In this case, the calling or upper half of the voice gate 350 will be turned on, thereby connecting line circuit 200 to the calling highway 520, while the lower half or called half of the voice gate 300 will be turned on, thereby connecting line circuit 100 to the called highway 530.

In the event that both the calling and called parties should attempt to transmit supervisory signals at the same instant, the currents will cancel out and no signal will be detected by the highway current detector 500. The highway voltage detector 560, however, will sense the change in highway potential from the presence of the two simultaneous signals and the highway voltage detector will pass a signal over lead 562 to the highway current detector 500 which then provides appropriate signals to the impulse analyzer 600.

When the calling and called parties disconnect, the contacts 111 and 211 will be opened and supervisory signals will, therefore, be transmitted to the highway. The impulse analyzer will analyze the supervisory signals and determine that they represent on-hook supervision and an appropriate signal will be transmitted over lead 601 to the control circuit 620. The control circuits, in turn, will transmit a signal over lead 623 to both the calling and called matrix and line number stores where the line busy marking will be erased so that the lines may be periodically interrogated in the time slot of the probe pulse.

While there has been described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

I claim:

1. In an automatic communication system; a plurality of communication circuits for originating and terminating communication connections, a communication channel common to said plurality of communication circuits, a plurality of individual gating means each selectively connecting a respective communication circuit to said channel upon actuation thereof, scanning means for actuating said gating means in a prescribed sequence, supervisory signal detector means coupled to said channel for detecting the presence and absence of supervisory signals in the form of current signals of given magnitude generated by said communication circuits, analyzer means connected to said detector means for indicating the terminating communication circuit designated by said supervisory signals, a tone signal circuit and control means responsive to said detector means detecting absence of said supervisory signals for connecting said tone signal circuit to the associated originating communication circuit and responsive to said analyzer means for simultaneously actuating the gating means associated with the originating communication circuit transmitting said supervisory signals and the terminating communication circuit designated by said supervisory signals periodically in a prescribed time slot of a repetitive communication time frame, said detector means including a channel terminating circuit selectively connected to and disconnected from said channel in response to said scanning means and said control means to provide a terminating circuit for said supervisory signals without interfering with voice signals in other time slots, said terminating circuit having an impedance substantially equal to the characteristic impedance of said channel.

2. The combination as set forth in claim 1 wherein supervisory current from the originating and terminating communication circuits flows in first and second different directions in said channel, said detector means including sensing means for determining the direction of the detected supervisory signals in said channel.

3. The combination as set forth in claim 2 further including allotting means for allotting a different time position of the repetitive time frame to each originating communication circuit in response to detection by said detector means of the absence of a supervisory signal transmitted by said originating communication circuit in another time position.

4. The combination as set forth in claim 3 wherein said allotting means is connected to said scanning means to prevent operation of the gating means of the originating communication circuit by said scanning means in the prescribed scanning sequence upon actuation by said detector means so that subsequent supervisory signals from said originating circuit are transmitted over said channel in said assigned time position.

5. The combination as set forth in claim 1 wherein said scanning means includes interrogating means for actuating said gating means in a repetitive sequential manner, off-hook detector means in each communication circuit for transmitting a supervisory signal to said channel only in response to an open line condition thereof upon actuation by said interrogating means, said detector means including means for detecting energization of said interrogating means in association with each gating means, and means energizing said control means only in response to said detecting means detecting energization of a gating means in coincidence with detection of absence of receipt of a supervisory signal from the communication circuit associated with said gating means.

6. The combination as set forth in claim 5 wherein said gating means connected to each communication circuit includes a calling bridge and a called bridge, said interrogating means being connected to the calling bridge of each gating means.

7. The combination as set forth in claim 5 wherein said off-hook detector means includes capacitive means for storing a potential charge, a voltage source connected to said capacitive means, and switch means for discharging the potential charge stored in said capacitive means in response to detection of an off-hook condition in said communication circuit.

8. The combination as set forth in claim 5 wherein said control means includes a voltage detector coupled to said channel for providing a characteristic signal in control of said supervisory signal detector means when supervisory signals are transmitted simultaneously from different communication circuits.

9. In an automatic communication system, a plurality of communication circuits for originating and terminating communication connections, a communication channel common to said plurality of communication circuits, each communication circuit including supervisory signal generating means for providing supervisory current pulse signals of given magnitude and a supervisory signal gate for connecting the associated communication circuit to said communication channel, signal probing means for periodically interrogating each of said supervisory signal gates, communication channel current detector means responsive to said supervisory current pulse signals for generating a first control signal upon failure to detect a supervisory signal on said communication channel, additional current detector means for detecting signals generated in response to the interrogation of each of said supervisory signal gates and for generating a second control signal upon detection of a signal from said supervisory signal gate, timing means for allotting a specific time slot of a repetitive communication time frame to each of said plurality of communication circuits only upon substantially coincident reception of said first control signal and said second control signal, control means responsive to said first control signal and said second control signal for actuating the supervisory signal gates associated with the originating communicating circuit transmitting said supervisory signal and the terminating communication circuit designated by said supervisory signals periodically in said specific time slot.

10. The combination as set forth in claim 9 wherein the supervisory signals from the originating and terminating communication circuit flows in first and second directions in said channel, said supervisory signals having one polarity when generated by the originating communication circuit and an opposite polarity when generated by the terminating communication circuit, said communication channel current detector means including sensing means for detecting the polarity of the supervisory signal to determine the direction of the supervisory signals in said communication channel.

11. The combination as set forth in claim 9 further including a channel terminating circuit connected to said channel to provide a terminating circuit for said supervisory signals, said channel terminating circuit being controlled by said channel current detector and by said control means so as to be periodically connected to said communication channel only during the receipt of supervisory signals on said channel.

12. The combination as set forth in claim 9 further including impulse analyzer means for detecting the significance of a series of supervisory signals on said communication channel to generate a third control signal for activating the supervisory signal gate associated with the terminating communication connection designated by said supervisory signal thereby connecting said terminating communication connection to said communication channel.

13. The combination as set forth in claim 9 further including a channel voltage detector coupled to said communication channel for providing an additional control signal when supervisory signals are transmitted simultaneously from different communication circuits.

References Cited

UNITED STATES PATENTS

| | | | |
|---|---|---|---|
| 2,917,583 | 12/1959 | Burton et al. | 179—18.9 |
| 2,936,338 | 5/1960 | James et al. | 179—18.9 |
| 3,146,314 | 8/1964 | Boehly et al. | 179—18.9 |
| 3,205,312 | 9/1965 | Brightman et al. | 179—15 |
| 3,223,784 | 12/1965 | Inose et al. | 179—18.9 |

KATHLEEN H. CLAFFY, *Primary Examiner.*

L. A. WRIGHT, *Assistant Examiner.*